US012609563B2

(12) United States Patent
Zhang et al.

(10) Patent No.: US 12,609,563 B2
(45) Date of Patent: Apr. 21, 2026

(54) DIRECT DRIVE MOTOR AND INTELLIGENT DEVICE

(71) Applicant: DONGGUAN DIRECT DRIVE TECHNOLOGY LIMITED, Dongguan (CN)

(72) Inventors: Di Zhang, Dongguan (CN); Yanan Yu, Dongguan (CN); Zhilong Zhu, Dongguan (CN); Ying Liu, Dongguan (CN)

(73) Assignee: DONGGUAN DIRECT DRIVE TECHNOLOGY LIMITED, Dongguan (CN)

( * ) Notice: Subject to any disclaimer, the term of this patent is extended or adjusted under 35 U.S.C. 154(b) by 196 days.

(21) Appl. No.: 18/395,651

(22) Filed: Dec. 25, 2023

(65) Prior Publication Data

US 2024/0128811 A1 Apr. 18, 2024

Related U.S. Application Data

(63) Continuation of application No. PCT/CN2021/139840, filed on Dec. 21, 2021.

(30) Foreign Application Priority Data

May 24, 2021 (CN) .......................... 202110565925.0

(51) Int. Cl.
*H02K 1/18* (2006.01)
*H02K 1/16* (2006.01)
(Continued)

(52) U.S. Cl.
CPC .............. *H02K 1/187* (2013.01); *H02K 1/16* (2013.01); *H02K 5/15* (2013.01); *H02K 7/085* (2013.01);
(Continued)

(58) Field of Classification Search
CPC ........ H02K 1/187; H02K 11/215; H02K 1/16; H02K 5/15; H02K 7/085; H02K 2211/03
(Continued)

(56) References Cited

U.S. PATENT DOCUMENTS

| | | | |
|---|---|---|---|
| 5,729,403 A | 3/1998 | Schuh | |
| 2003/0160537 A1* | 8/2003 | Hsu | H02K 11/33 |
| | | | 310/254.1 |
| 2021/0013781 A1 | 1/2021 | Hu | |

FOREIGN PATENT DOCUMENTS

| | | | |
|---|---|---|---|
| CN | 205846996 U | 12/2016 | |
| CN | 208424164 U * | 1/2019 | |

(Continued)

OTHER PUBLICATIONS

The extended European search report of EP patent application No. 21942817.4 issued on Apr. 15, 2025.
(Continued)

*Primary Examiner* — Jose A Gonzalez Quinones
(74) *Attorney, Agent, or Firm* — Andrew C. Cheng

(57) ABSTRACT

A direct drive motor includes a base, a stator assembly provided on the outer periphery of the base, a rotating shaft assembly provided in the base, and a rotor assembly connected to the rotating shaft assembly and covering the stator assembly. The base includes an inner end, an outer end, and a receiving chamber passing through the inner end and the outer end. The rotating shaft assembly is rotatably mounted in the receiving chamber. A first circuit board is mounted at the inner end; a recess is formed in the outer end; a second circuit board is mounted in the recess; and the first circuit board is connected to the second circuit board. When being applied to an apparatus such as an intelligent device and an intelligent robot, the direct drive motor is good in stability, high in intelligence, reliable in overall structure, and strong in practicability.

20 Claims, 8 Drawing Sheets

(51) Int. Cl.
   *H02K 5/15*          (2006.01)
   *H02K 7/08*          (2006.01)
   *H02K 11/215*        (2016.01)

(52) U.S. Cl.
   CPC ........ *H02K 11/215* (2016.01); *H02K 2211/03*
                                              (2013.01)

(58) Field of Classification Search
   USPC ...................................................... 310/67 R
   See application file for complete search history.

(56)                   References Cited

FOREIGN PATENT DOCUMENTS

| | | | |
|---|---|---|---|
| CN | 110380526 | A | 10/2019 |
| CN | 113258725 | A | 8/2021 |
| CN | 214755970 | U | 11/2021 |
| CN | 215300405 | U | 12/2021 |
| CN | 215300416 | U | 12/2021 |
| EP | 1265341 | A1 | 12/2002 |
| WO | 2020231749 | A1 | 11/2020 |

OTHER PUBLICATIONS

Search report of CN application No. 202110565925.0 issued on Jan. 11, 2022.
International search report of PCT patent application No. PCT/CN2021/139840 issued on Mar. 2, 2022.

* cited by examiner

DIRECT DRIVE MOTOR AND INTELLIGENT DEVICE

CROSS-REFERENCES TO RELATED APPLICATIONS

The present application claims priority to the Chinese patent application No. 202110565925.0, entitled "direct drive motor and intelligent apparatus" filed with the China National Intellectual Property Administration on May 24, 2021, the entire contents of which are incorporated herein by reference.

TECHNICAL FIELD

The present invention relates to the technical field of intelligent fitness, in particular to a direct drive motor and an intelligent device.

BACKGROUND

With the rapid development of science and technology, people's requirements for living conditions are getting higher and higher, and the quality of life is also improving. The pursuit of living standards and enjoying life have become the direction people yearn for, Freeing hands and letting robots work instead of people. At present, with various intelligent apparatus such as intelligent robots, intelligent cleaning equipment and other intelligent equipment have become more and more popular in the market.

Among them, the driving wheel assembly as a moving structure of intelligent equipment is an indispensable and important structure of the intelligent robot. The existing driving wheel assembly has a motor as a power source to drive the intelligent, cleaning and other equipment to move. The existing motors generally have a single structure, and an additional external controller is needed to realize intelligent control of transmission. The external control structure has high cost and poor stability.

SUMMARY OF THE INVENTION

In order to solve the above problems, the present invention provides a direct drive motor and an intelligent device with good stability, high intelligence, reliable overall structure and strong practicability for being applied in equipment such as intelligent apparatus and intelligent robots.

The above-mentioned purpose can be achieved by adopting the following technical solution.

A direct drive motor comprises a base, a stator assembly disposed on an outer periphery of the base, a rotating shaft assembly disposed in the base, and a rotor assembly connected to the rotating shaft assembly and covered on the stator assembly, wherein the base includes an inner end, an outer end, and a receiving chamber passing through the inner end and the outer end, the rotating shaft assembly is rotatably installed in the receiving chamber, the inner end is provided with a first circuit board, the outer end is provided with a recess, a second circuit board is mounted in the recess, and the first circuit board is connected with the second circuit board.

The details of one or more embodiments of the invention are described in the accompanying drawings and the description below Other features, objectives and advantages of the present invention will be apparent from the description, drawings and claims.

Beneficial Effect

Compared with traditional direct drive motors, the present invention solves the problem of single structure and single function of the traditional motor, and integrates the circuit control structure inside the motor, and at the same time, a sensing detection circuit board is arranged inside the motor, realizing a dual circuit integrated structure. The motor has good stability and high intelligence when it is used in equipment such as intelligent apparatus and intelligent robots. It does not require external space to install controllers, and can also save space for installing interactive sensing components. The overall structure is reliable and practical. Specifically, the base, the stator assembly disposed on the outer periphery of the base, the rotating shaft assembly disposed inside the base, and the rotor assembly connected to the rotating shaft assembly and covered on the stator assembly are provided. The base includes an inner end, an outer end, and a receiving chamber passing through the inner end and the outer end. The rotating shaft assembly is rotatably installed in the receiving chamber, and the inner end is installed with the first circuit board, and the outer end is provided with a recess, and the second circuit board is mounted in the recess, and the first circuit board is connected to the second circuit board. During working, the first circuit board is used as the main control circuit board to control rotation of the motor. During rotation of the motor, the stator assembly and the rotor assembly cooperate with each other to ensure the balance and stability of the rotation under the action of the rotating shaft assembly. The overall structure is reliable. In addition, the second circuit board is arranged for sensing and interaction detection. The overall structure is simple and compact, and has strong practicability.

BRIEF DESCRIPTION OF THE DRAWINGS

In order to better describe and illustrate embodiments and/or examples of the inventions disclosed herein, reference may be made to one or more of the accompanying drawings. Additional details or examples used to describe the drawings should not be considered limitations on the scope of any of the disclosed inventions, the presently described embodiments and/or examples, and the best mode of these inventions currently understood.

Figure 1:
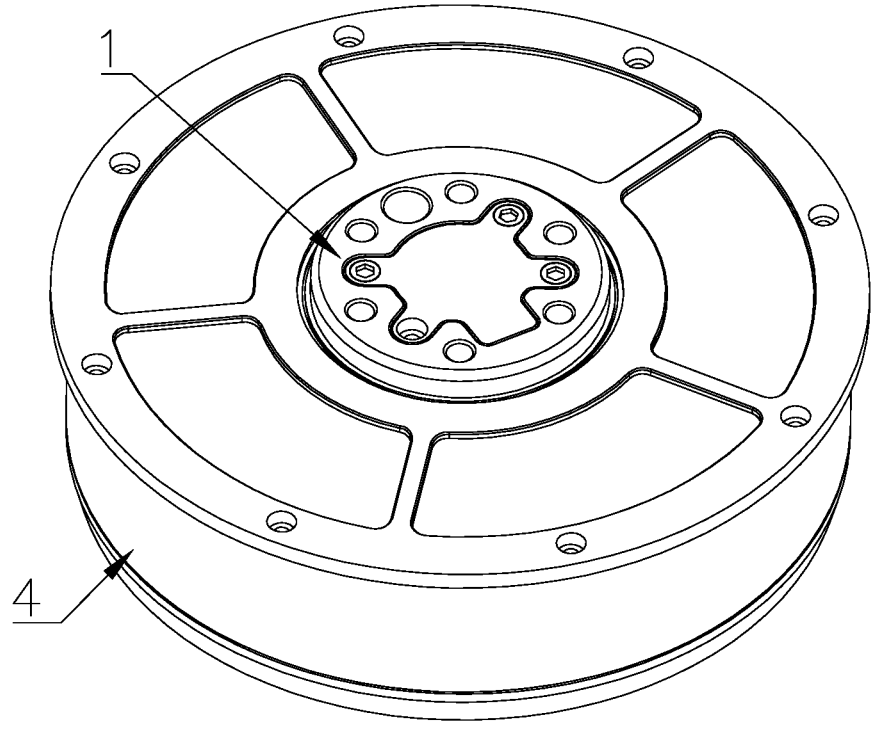
FIG. 1 is a schematic perspective diagram of the direct drive motor of the present invention.

Reference numerals: base 1, inner end 11, platform 111, flange 111a, mounting hole 111b, avoidance position 111c, fastening groove 112, outer end 12, recess 121 through hole 122, cover plate 123, receiving chamber 13, first limiting groove 131, second limiting groove 132, first circuit board 14, through hole 141, second circuit board 15, first sensing component 151, second sensing component 152, sensing element 153, stator assembly 2, iron core 21, coil 22, tooth 23, rotating shaft assembly 3, bearing member 31, rotating shaft 32, fixing element 33, rotor assembly 4, outer end cap 41, reinforced platform 411, connection hole 412, connecting ring 42, rotor element 43, inner end cap 44, connecting bearing 441.

DETAILED DESCRIPTION OF EMBODIMENTS

For better understanding of the above objectives, features, and advantages of the application, a detailed description of the application will be provided below with reference to the attached drawings and specific ways of embodiment. It is noted that without causing conflicts, embodiments of the application and features of the embodiments are combinable with each other.

It should be noted that when an element is referred to as being "fixed" to another element, it can be directly fixed on the other element or indirectly fixed to the other element through one or multiple intervening elements. When an element is referred to as being "connected to" another element, it can be directly connected to the other element through one or multiple intervening elements.

Unless otherwise defined, all technical and scientific terms used herein have the same meaning as commonly understood by one of ordinary skill in the technical field of the invention. The terms used in the description of the present invention are for the purpose of describing specific embodiments only, and are not intended to limit the present invention.

Figure 2:
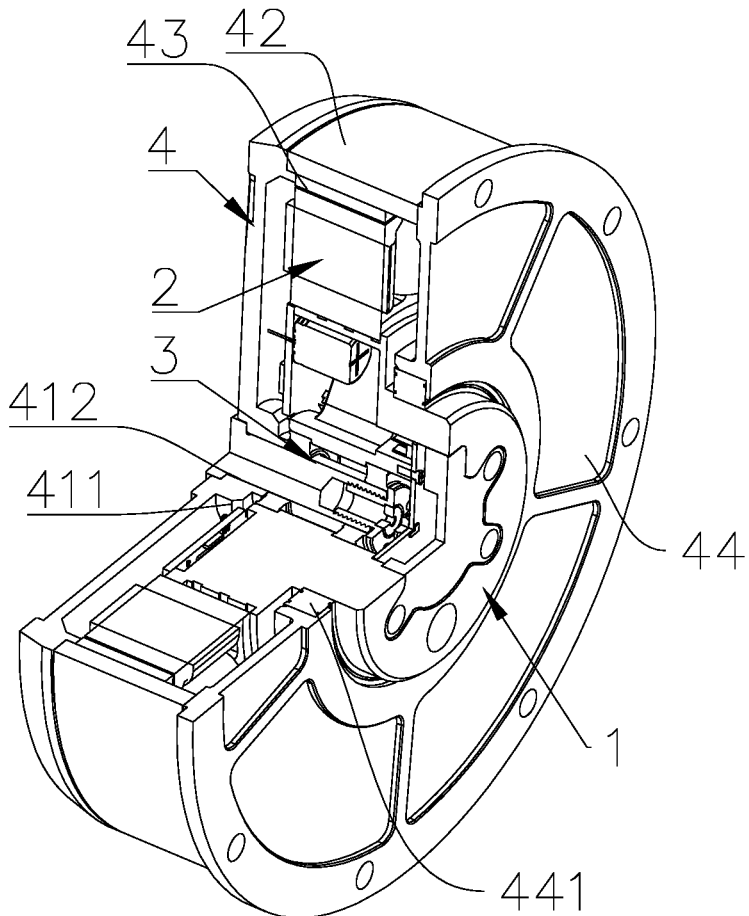
FIG. 2 is a three-dimensional sectional view of the direct drive motor in FIG.
Figure 3:
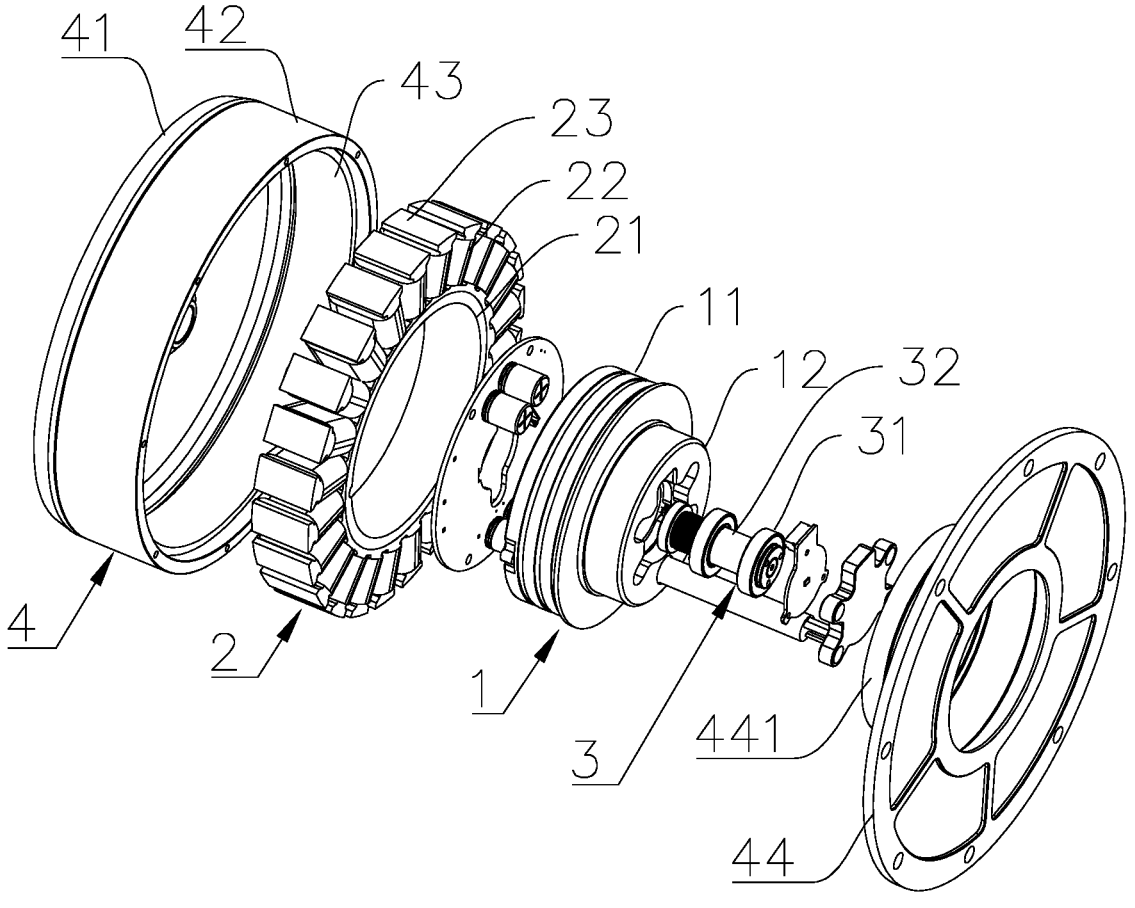
FIG. 3 is an exploded view of the direct drive motor in FIG. 1.
Figure 4:
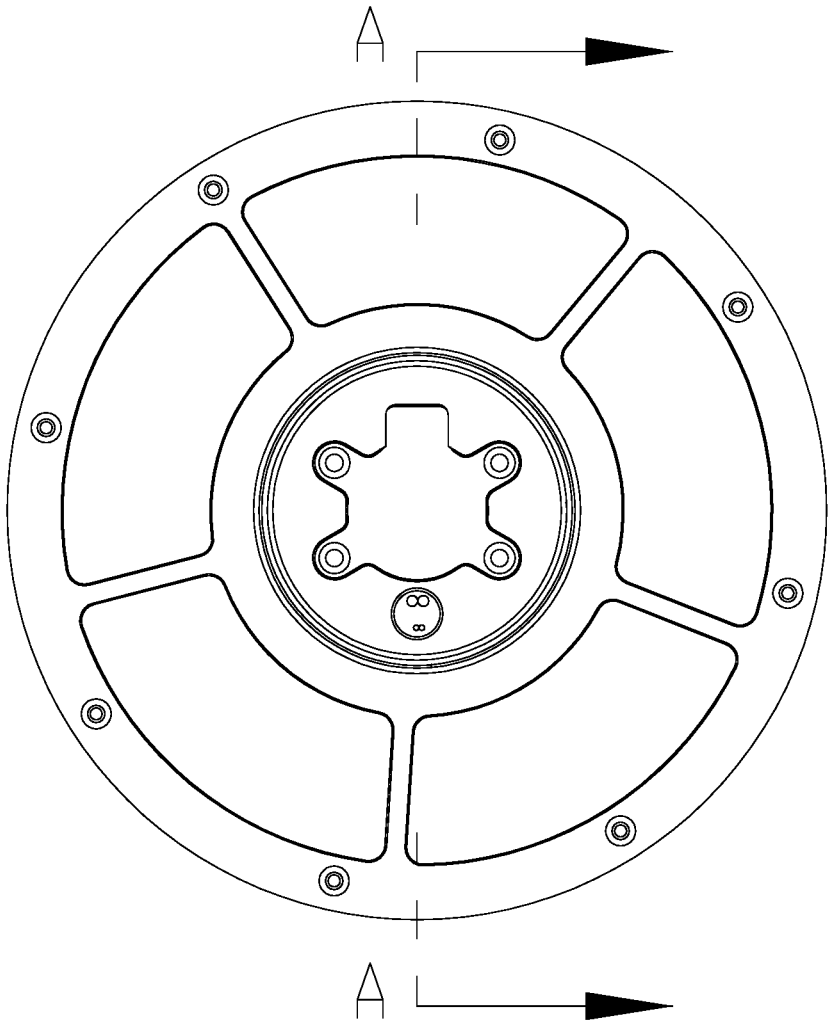
FIG. 4 is a front view of the direct drive motor in FIG. 1.
Figure 5:
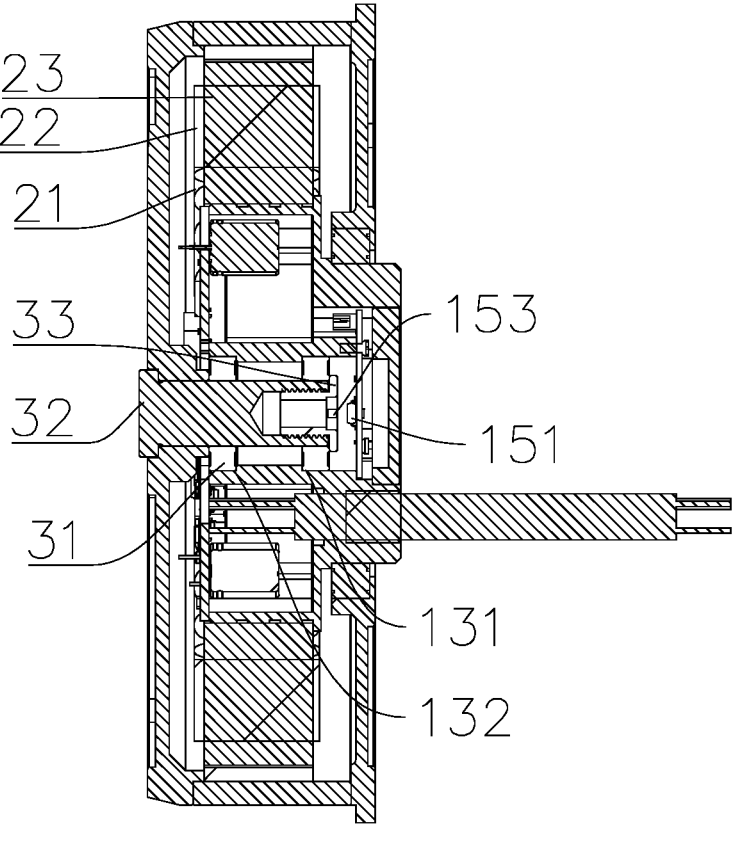
FIG. 5 is a cross-sectional view taken along line A-A of FIG. 4.
Figure 6:
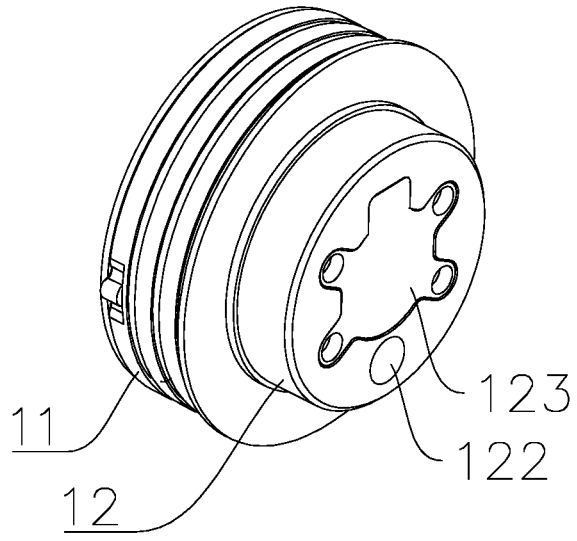
FIG. 6 is a schematic perspective view of a base of the direct drive motor in FIG. 2.
Figure 7:
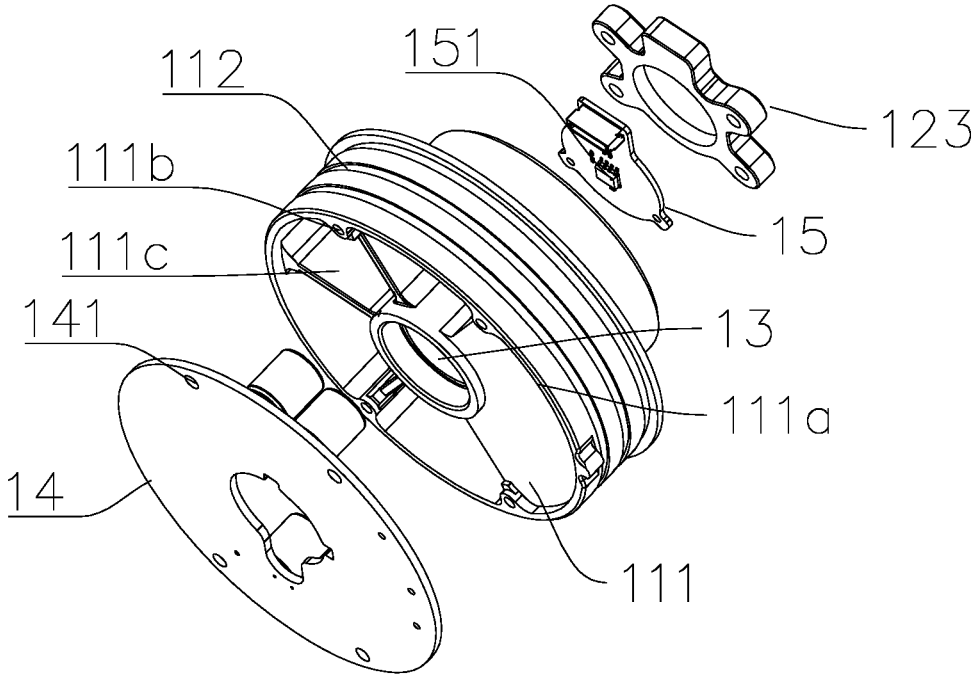
FIG. 7 is an exploded view of the base in FIG. 6.
Figure 8:
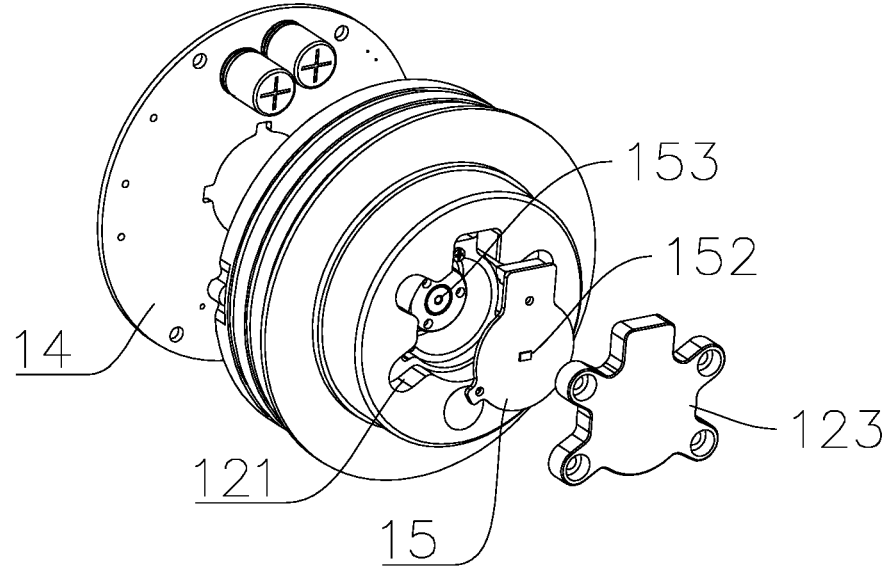
FIG. 8 is another exploded view of the base in FIG. 6, viewed from another aspect.

As shown in FIGS. 1 to 8, a direct drive motor includes a base 1, a stator assembly 2 arranged on the periphery of the base 1, a rotating shaft assembly 3 arranged in the base 1, and a rotor assembly 4 connected to the rotating shaft assembly 3 and sleeved on the of the stator assembly 2. The base 1 includes an inner end 11, an outer end 12, and a receiving chamber 13 passing through the inner end 11 and the outer end 12. The rotating shaft assembly 3 is rotatably installed in the rotating receiving chamber 13. The inner end 11 is equipped with a first circuit board 14, the outer end 12 is provided with a recess 121, and a second circuit board 15 is mounted in the recess 121, and the first circuit board 14 is electrically connected to the second circuit board 15.

In this embodiment, the inner end 11 comprises a platform 111, and the outer edge of the platform 111 is provided with a flange 111a. The flange 111a defines a plurality of mounting holes Mb. The first circuit board 14 defines a plurality of through holes 141 corresponding to the mounting holes 111b respectively. The flange 111a protrudes upwardly from the outer edge of the platform 111 to thereby form a suspended space which can accommodate some smaller electronic components on the first circuit board 14, so that the electronic components can dissipate heat better. In addition, screws can pass through the through hole 141 and the mounting hole 111b to fix the first circuit board 14 to the inner end 11, which is convenient for installation and have a good stability.

The platform 111 is provided with several avoidance positions 111c, at least one evacuation position 111c is for passing of a connecting wire which connects the first circuit board 14 and the second circuit board 15, and the avoidance positions 111c can be used for receiving larger electronic components, to facilitate installation and heat dissipation of the electronic components on the first circuit board 14. The first circuit board 14 is connected and fixed to the second circuit board 15 through the connecting wire, which makes the structure simple and reliable.

In this embodiment, the outer end 12 is provided with a through hole 122, and the through hole 122 is in communication with the vacant position 111c to allow the connecting wire to pass therethrough to connect with the first circuit board 14. The through hole 122 can allow data cable connected with the first circuit board 14 to pass therethrough to connect with the smart apparatus.

In another embodiment, the through hole 122 is located on one side of the recess 121. Since the recess 121 is located at the center, arranging the through hole 122 on one side of the recess 121 can facilitate wiring, and the structure is simple and reliable.

In this embodiment, the recess 121 is provided with a cover plate 123 through which a sensing signal can pass, and the cover plate 123 can be used to pass through a detection sensing signal, so as to facilitate realization of intelligent sensing and interactive operation.

In another embodiment, the cover plate 123 is a transparent or translucent cover plate 123 to facilitate passing of sensing signals for detection, sensing and interaction.

In this embodiment, the first circuit board 14 is a control circuit board, the second circuit board 15 is a sensing circuit board, the control circuit board is mainly used to control the operation of the direct drive motor, and the second circuit board 15 is used for sensing and detection.

In this embodiment, the second circuit board 15 is provided with a first sensing component 151 on one side thereof corresponding to the recess 121, and a second sensing component 152 on the other side thereof opposite to the first sensing component 151, a sensing element 153 corresponding to the first sensing component 151 is provided, and the sensing element 153 is connected to the rotating shaft assembly 3. The first sensing component 151 and the second sensing component 152 are provided. The second sensing component 152 is used to detect external conditions, and can be used for intelligent interactive sensing, so that a good intelligent performance can be achieved. The first sensing component 151 cooperates with the sensing element 153 to sense the transmission stroke and position, and the overall structure is stable and reliable.

Wherein, the second sensing component 152 is one or a combination of two or more of a detection sensor, a light sensor, a buzzer and an infrared sensor. A suitable sensing component can be selected according to requirements of the smart device, which has good practicability and wide range of applications.

Wherein, the first sensing component 151 is a Hall sensor, and the sensing element 153 is a magnetic sensing element 153, which uses a magnetic field detection way to sense the rotational position.

In this embodiment, the stator assembly 2 includes an iron core 21 and coils 22 uniformly distributed on the iron core 21. The iron core 21 comprises a plurality of teeth 23 uniformly distributed in the circumferential direction thereof, and the coils 22 are wound around the teeth 23. The iron core 21 cooperates with the coil 22, so as to cooperate with the rotor assembly 4 to realize the output transmission of the motor.

The outer circumferential surface of the inner end 11 corresponding to the inner circumferential surface the iron core 21 is provided with several fastening grooves 112. The fastening grooves 112 are used for firmly fastening and assembling the iron core 21 and the inner end 11 so that the structure is stable and reliable.

In this embodiment, the rotating shaft assembly 3 includes a bearing member 31 installed in the receiving chamber 13, and a rotating shaft 32 rotatably installed in the bearing 31 one end of the rotating shaft 32 is connected to the rotor assembly 4, and the other end is installed with a fixing element 33 which faces the second circuit board 15. The rotating shaft 32 is rotatably installed through the bearing member 31, and rotates with the rotor assembly 4, which has good stability and high precision. Further, the sensing element 153 is disposed on the fixing element 33 and cooperates with the first sensing component 151 to sense the position of the rotating shaft 32.

The receiving chamber 13 is provided with a first limiting groove 131 and a second limiting groove 132, and the bearing member 31 is provided with two bearings, and the two bearings are respectively installed in the first limiting groove 131 and the second limiting groove 132. Two bearings are used for installing with limited fit, so that the structure is stable and reliable, the transmission stability is good, and the precision is high.

In this embodiment, the rotor assembly 4 includes an outer end cap 41 connected to the rotating shaft assembly 3, a connecting ring 42 connected to the outer end cap 41 and corresponding to the outer edge of the stator assembly 2, and a rotor element 43 installed in the connecting ring 42 and corresponding to the stator assembly 2. The side of the connecting ring 42 away from the outer end cap 41 is connected with an inner end cap 44, and the inner end cap 44 is rotatably connected to the outer periphery of the outer end. The inner end cap 44 and the outer end cap 41 cooperatively form a fixed structure on two sides with the connecting ring 42 connecting the two sides, so that the device has good stability during operation.

The outer end cap 41 is provided with a reinforced platform 411, and the reinforced platform 411 defines a connection hole 412, and the connection hole 412 is provided with a limit shoulder, and the outer end cap 41 is connected with the rotating shaft assembly 3 through the connection hole 412. Arrangement of the reinforced platform 411 improves the connection stability, and the stability is better during the transmission process.

The inner end cap 44 is connected with a connecting bearing 441, and the connecting bearing 441 is sleeved on the outer surface of the outer end 12. The inner end cap 44 is rotatably connected to the outer end 12 by cooperating with the connecting bearing 441, thereby reducing the load on the rotating shaft 32 and improving stability and extend service life.

The present invention solves the problem of single structure and single function of the traditional motor, and integrates the circuit control structure inside the motor, and at the same time, a sensing detection circuit board is arranged inside the motor, realizing a dual circuit integrated structure. The motor has good stability and high intelligence when it is used on equipment such as intelligent devices and intelligent robots. It does not require external space to install controllers, and can also save space for installing interactive sensing components. The overall structure is reliable and practical. Specifically, the base 1, the stator assembly 2 disposed on the outer periphery of the base 1, the rotating shaft assembly 3 disposed inside the base 1, and the rotor assembly 4 connected to the rotating shaft assembly 3 and covered on the stator assembly 2 are provided. The base 1 includes an inner end 11, an outer end 12, and a receiving chamber 13 passing through the inner end 11 and the outer end 12. The rotating shaft assembly 3 is rotatably installed in the receiving chamber 13, and the inner end 11 is installed with the first circuit board 14, and the outer end 12 is provided with a recess 121, and the recess 121 is installed with the second circuit board 15, and the first circuit board 14 is connected to the second circuit board 15. During working, the first circuit board 14 is used as the main control circuit board to control rotation of the motor. During rotation of the motor, the stator assembly 2 and the rotor assembly cooperate to each other to ensure the balance and stability of the rotation under the action of the rotating shaft assembly 3. The overall structure is reliable. In addition, the second circuit board 15 is arranged for sensing and interaction detection. The overall structure is simple and compact, and has strong practicability.

Intelligent devices, intelligent robots and other equipment using the above structure can save installation space and improve structural stability and reliability.

The description provided above illustrate only the preferred embodiments of the application and is not intended to limit the application. For artisans having ordinary skill, the application can be modified and varies in various ways. Thus, all modifications, equivalent substitutions, and improvements, which are made within the spirit and scope of the application should be construed falling within the scope of protection that the application pursues.

What is claimed is:

1. A direct drive motor, comprising a base, a stator assembly disposed on an outer periphery of the base, a rotating shaft assembly disposed in the base, and a rotor assembly connected to the rotating shaft assembly and covered on the stator assembly, wherein the base includes an inner end, an outer end, and a receiving chamber passing through the inner end and the outer end, the rotating shaft assembly is rotatably installed in the receiving chamber, the inner end is provided with a first circuit board, the outer end is provided with a recess, a second circuit board is mounted in the recess, and the first circuit board is connected with the second circuit board;

wherein the inner end comprises a platform which is provided with an avoidance position; and the outer end is provided with a through hole in communication with the avoidance position to allow a connecting wire to pass therethrough to connect with the first circuit board.

2. The direct drive motor according to claim 1, wherein an outer edge of the platform is provided with a flange, and the flange defines mounting holes, and the first circuit board defines through holes corresponding to the mounting holes respectively.

3. The direct drive motor according to claim 2, wherein the platform is provided with several said avoidance positions.

4. The direct drive motor according to claim 1, wherein the through hole is located on one side of the recess.

5. The direct drive motor according to claim 1, wherein the recess is provided with a cover plate through which sensing signals can pass.

6. The direct drive motor according to claim 5, wherein the cover plate is a transparent or translucent cover plate.

7. The direct drive motor according to claim 1, wherein the first circuit board is a control circuit board, and the second circuit board is a sensing circuit board.

8. A direct drive motor, comprising a base, a stator assembly disposed on an outer periphery of the base, a rotating shaft assembly disposed in the base, and a rotor assembly connected to the rotating shaft assembly and covered on the stator assembly, wherein the base includes an inner end, an outer end, and a receiving chamber passing through the inner end and the outer end, the rotating shaft assembly is rotatably installed in the receiving chamber, the inner end is provided with a first circuit board, the outer end is provided with a recess, a second circuit board is mounted in the recess, and the first circuit board is connected with the second circuit board; and wherein a side of the second circuit board corresponding to the recess is provided with a first sensing component, and the side corresponding to the receiving chamber is provided with a second sensing component, and the first sensing component is correspondingly provided with a sensing element, and the sensing element is connected to the rotating shaft assembly.

9. The direct-drive motor according to claim 8, wherein the first sensing component is one or a combination of two or more of a detection sensor, a light sensor, a buzzer and an infrared sensor.

10. The direct drive motor according to claim 8, wherein the second sensing component is a Hall sensor, and the sensing element is a magnetic sensing element.

11. The direct drive motor according to claim 1, wherein the stator assembly includes an iron core and coils uniformly distributed on the iron core, the iron core comprises a plurality of teeth evenly distributed in a circumferential direction thereof, and the coils are wound around the teeth.

12. The direct drive motor according to claim 11, wherein several fastening grooves are formed in an outer circumferential surface of the inner end corresponding to the inner circumferential surface of the iron core.

13. The direct drive motor according to claim 1, wherein the rotating shaft assembly includes a bearing member installed in the receiving chamber, and a rotating shaft rotatably installed in the bearing member, one end of the rotating shaft is connected to the rotor assembly, the other end of the rotating shaft is provided with a fixing element, and the fixing element faces the second circuit board.

14. The direct-drive motor according to claim 13, wherein the receiving chamber is provided with a first limiting groove and a second limiting groove, and the bearing member comprises two bearings which are respectively installed in the first limiting groove and the second limiting groove.

15. The direct drive motor according to claim 1, wherein the rotor assembly includes an outer end cap connected to the rotating shaft assembly, a connecting ring connected to the outer end cap and corresponding to the outer periphery of the stator assembly, and a rotor element mounted to the connecting ring and corresponding to the stator assembly, an end of the connecting ring away from the outer end cap is connected to an inner end cap, and the inner end cap is rotatably connected to an outer circumferential surface of the outer end.

16. The direct drive motor according to claim 15, wherein the outer end cap is provided with a reinforced platform, the reinforced platform is provided with a connecting hole, the connection hole is provided with a limit shoulder, and the outer end cap is connected with the rotating shaft assembly by the connection hole.

17. The direct drive motor according to claim 15, wherein the inner end cap is connected with a connecting bearing which is sleeved on an outer circumferential surface of the outer end.

18. An intelligent device, comprising the direct drive motor described in claim 15.

19. A direct drive motor, comprising a base, a stator assembly disposed on an outer periphery of the base, a rotating shaft assembly disposed in the base, and a rotor assembly connected to the rotating shaft assembly and covered on the stator assembly;

wherein the base includes an inner end, an outer end, and a receiving chamber passing through the inner end and the outer end, the rotating shaft assembly is rotatably installed in the receiving chamber, the inner end is provided with a first circuit board, the outer end is provided with a recess, a second circuit board is mounted in the recess, and the first circuit board is connected with the second circuit board; and wherein the rotating shaft assembly includes a bearing member installed in the receiving chamber, and a rotating shaft rotatably installed in the bearing member, one end of the rotating shaft is connected to the rotor assembly, the other end of the rotating shaft is provided with a fixing element, and the fixing element faces the second circuit board.

20. The direct-drive motor according to claim 19, wherein the receiving chamber is provided with a first limiting groove and a second limiting groove, and the bearing member comprises two bearings which are respectively installed in the first limiting groove and the second limiting groove.

\* \* \* \* \*